United States Patent
Guthrie et al.

(10) Patent No.: US 10,261,330 B2
(45) Date of Patent: Apr. 16, 2019

(54) SYSTEM FOR PRODUCING AN OUTPUT LIGHT BEAM OF A GIVEN SPECTRUM

(71) Applicant: CHRISTIE DIGITAL SYSTEMS USA, INC., Cypress, CA (US)

(72) Inventors: Simon Guthrie, Kitchener (CA); Daniel Robert Adema, Kitchener (CA); Graham Hill, Waterloo (CA)

(73) Assignee: CHRISTIE DIGITAL SYSTEMS USA, INC., Cypress, CA (US)

( * ) Notice: Subject to any disclaimer, the term of this patent is extended or adjusted under 35 U.S.C. 154(b) by 321 days.

(21) Appl. No.: 14/834,506

(22) Filed: Aug. 25, 2015

(65) Prior Publication Data
US 2017/0059126 A1     Mar. 2, 2017

(51) Int. Cl.
| | |
|---|---|
| *F21V 9/30* | (2018.01) |
| *G02B 27/14* | (2006.01) |
| *H04N 9/31* | (2006.01) |
| *G02B 27/10* | (2006.01) |

(Continued)

(52) U.S. Cl.
CPC .............. *G02B 27/141* (2013.01); *F21V 9/30* (2018.02); *G02B 27/1006* (2013.01); *H04N 9/3158* (2013.01); *H04N 9/3161* (2013.01); *H04N 9/3164* (2013.01); *F21Y 2101/00* (2013.01); *G03B 21/204* (2013.01)

(58) Field of Classification Search
CPC ... F21V 9/16; G02B 27/1006; G02B 27/1046; G02B 27/141; G02B 27/1013; H04N 9/3158; H04N 9/3161; H04N 9/3164
See application file for complete search history.

(56) References Cited

U.S. PATENT DOCUMENTS

| | | | | |
|---|---|---|---|---|
| 5,826,959 | A | * 10/1998 | Atsuchi | G02B 27/1026 348/E9.027 |
| 5,875,008 | A | * 2/1999 | Takahara | G02F 1/133345 348/E9.027 |

(Continued)

FOREIGN PATENT DOCUMENTS

| | | |
|---|---|---|
| KR | 1020130017031 A | 2/2013 |
| WO | 2014137565 A1 | 9/2014 |

OTHER PUBLICATIONS

Extended European Search Report dated Jan. 19, 2017 for European Patent Application No. 16184644.9.

*Primary Examiner* — Zheng Song
(74) *Attorney, Agent, or Firm* — Perry + Currier, Inc.

(57) ABSTRACT

A system for producing an output light beam of a given spectrum is provided. The system comprises: a light source; a separator configured to separate an input light beam, from the light source, into a retained light beam directed along a first path and an excess light beam directed along a second path, based on wavelength of the input light beam; an optical power shifter positioned to intercept the excess light beam, the optical power shifter configured to convert the excess light beam into a power-shifted light beam comprising at least some wavelengths and/or power red-shifted relative to the excess light beam; and a combiner positioned to intercept both the retained light beam and the power-shifted light beam, the combiner configured to combine the retained light beam and the power-shifted light beam onto a common path to produce the output light beam.

17 Claims, 5 Drawing Sheets

(51) Int. Cl.
 *G03B 21/20* (2006.01)
 *F21Y 101/00* (2016.01)

(56) References Cited

U.S. PATENT DOCUMENTS

| | | | |
|---|---|---|---|
| 2008/0013329 A1* | 1/2008 | Takeda | F21K 9/00 |
| | | | 362/459 |
| 2008/0158873 A1 | 7/2008 | Bierhuizen et al. | |
| 2009/0268461 A1 | 10/2009 | Deak et al. | |
| 2010/0328632 A1* | 12/2010 | Kurosaki | G03B 21/204 |
| | | | 353/98 |
| 2013/0070205 A1* | 3/2013 | Pan | H04N 9/3117 |
| | | | 353/31 |
| 2013/0242534 A1* | 9/2013 | Pettitt | G03B 21/204 |
| | | | 362/84 |
| 2013/0278902 A1* | 10/2013 | Chen | G03B 21/204 |
| | | | 353/31 |
| 2014/0016297 A1* | 1/2014 | Mehl | F21V 13/02 |
| | | | 362/19 |
| 2014/0176914 A1* | 6/2014 | Mueller | F21S 10/007 |
| | | | 353/31 |
| 2014/0230992 A1 | 8/2014 | Kim et al. | |
| 2014/0246689 A1 | 9/2014 | Luo et al. | |
| 2015/0049456 A1 | 2/2015 | Hoehmann et al. | |
| 2015/0146406 A1* | 5/2015 | Chang | F21V 9/08 |
| | | | 362/84 |
| 2015/0253654 A1* | 9/2015 | Hu | G03B 21/20 |
| | | | 353/31 |
| 2015/0316775 A1* | 11/2015 | Hsieh | G03B 21/2013 |
| | | | 353/31 |

\* cited by examiner

SYSTEM FOR PRODUCING AN OUTPUT LIGHT BEAM OF A GIVEN SPECTRUM

FIELD

This specification relates generally to optical systems and specifically to a system for producing an output light beam of a given spectrum.

BACKGROUND

To operate efficiently and with minimal light waste, many projectors require a light beam that has a balance of three colors for producing an adequately large colour gamut. However, many traditional light sources produce a light beam that deviates from such an optimal balance. As a result, some portions of the generated light beam may not be usable to generate the projected image; these portions would constitute wasted power and contribute to unwanted heat. Additional power can be used to deal with the unwanted heat (e.g. in the form of active cooling components and the like), which leads to an overall degradation of the energy efficiency of such systems.

For example, in the case of a light source comprising a yellow phosphor excited by a blue laser, the light beam generated by the yellow phosphor may have an excess of yellow and green, and a deficiency of red. While other emitters, such as quantum dots can emit red light, these quantum dots typically operate at incident power levels lower than required for many projection applications.

SUMMARY

In order to produce an output light beam that has a balance of colors desirable for a given application, such as projection, there is provided a system comprising a light source, a separator, an optical power shifter, and a combiner. The separator is configured to separate an input light beam, from the light source, into a retained light beam directed along a first path and an excess light beam directed along a second path, based on wavelength of the input light beam. The excess light beam generally comprises colors and/or wavelengths of the input light beam that cannot be used for the given application.

The optical power shifter is positioned to intercept the excess light beam and is configured to convert the excess light beam into a power-shifted light beam comprising at least some wavelengths and/or power red-shifted relative to the excess light beam, and specifically into colors and/or wavelengths used in the given application.

The combiner is positioned to intercept both the retained light beam and the power-shifted light beam, and is configured to combine the retained light beam and the power-shifted light beam onto a common path to produce the output light beam. This output light beam can comprise a better balance of colors and/or wavelengths useful for the given application, such as projection, than did the input light beam.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, ZZ, and the like). Similar logic can be applied for two or more items in any occurrence of "at least one . . . " and "one or more . . . " language.

An aspect of the specification provides a system for producing an output light beam of a given output spectrum, the system comprising: a light source; a separator configured to separate an input light beam, from the light source, into a retained light beam directed along a first path and an excess light beam directed along a second path, based on wavelength of the input light beam; an optical power shifter positioned to intercept the excess light beam, the optical power shifter configured to convert the excess light beam into a power-shifted light beam comprising at least some power red-shifted relative to the excess light beam; and a combiner positioned to intercept both the retained light beam and the power-shifted light beam, the combiner configured to combine the retained light beam and the power-shifted light beam onto a common path to produce the output light beam.

An input power shifting profile of the optical power shifter can be selected to at least partially overlap a respective spectrum of the excess light beam produced by the separator.

An output power shifting profile of the optical power shifter can be selected such that, the output power shifting profile of the optical power shifter combined with a respective spectrum of the retained light beam about matches the given output spectrum of the output light beam.

The optical power shifter can comprise a plurality of quantum dots configured to absorb at least some wavelengths of the excess light beam and to emit light red-shifted relative thereto. At least one of a size distribution and a composition of the quantum dots can be configured so that an absorption spectrum of the quantum dots at least partially overlaps a respective spectrum of the excess light beam. At least one of a size distribution and a composition of the quantum dots can be configured so that an absorption spectrum of the quantum dots is one or more of: similar to a respective spectrum of the excess light beam; and, about matches the respective spectrum of the excess light beam. At least one of a size distribution and a composition of the quantum dots can be configured so that an emission spectrum of the quantum dots combined with a respective spectrum of the retained light beam yields the given output spectrum. The separator can comprise a dichroic mirror; the excess light beam can corresponds to a dichroic excess light separation profile being one of a transmission spectrum and a reflection spectrum of the dichroic mirror; and at least one of a size distribution and a composition of the quantum dots can be configured so that an absorption spectrum of the quantum dots at least partially overlaps the dichroic excess light separation profile. The absorption spectrum of the quantum dots can be one or more of: similar to the dichroic excess light separation profile; and, matching the dichroic excess light separation profile.

The separator can be dynamically tuneable to separate the input light beam based on a given separation spectrum.

The separator can be further configured to separate the input light beam based on intensity of the input light beam. The separator can be dynamically tuneable to separate the input light beam based on a given separation intensity threshold profile.

The separator can comprise one or more of a prism, a dichroic mirror, a digital micromirror device, a bandpass filter, a Bragg stack, and a photonic crystal.

The light source can comprise a laser and a photoluminescent material, the laser emitting a laser light configured to excite the photoluminescent material to emit the input light beam.

The combiner can be configured to add one or more of at least a portion of light from the light source and light from a further light source to the retained light beam and the power-shifted light beam along the common path to produce the output light beam of the given output spectrum.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
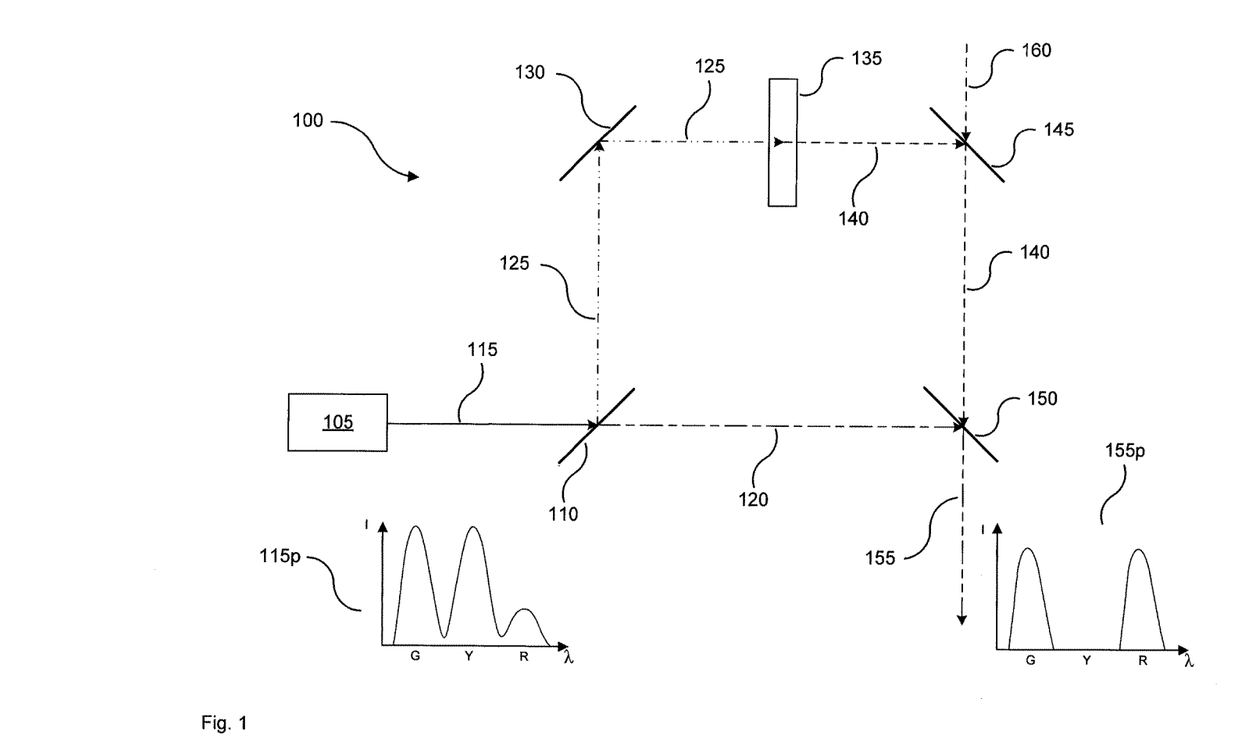
FIG. 1 depicts a schematic representation of a system configured to produce an output light beam of a given output spectrum, according to non-limiting implementations.

FIG. 1 shows a system 100 configured to produce an output light beam of a given output spectrum. System 100 comprises a light source 105, a separator 110, an optical power shifter 135, and a combiner 150. Separator 110 is configured to separate an input light beam 115, from light source 105, into a retained light beam 120 directed along a first path and an excess light beam 125 directed along a second path, based on wavelength of input light beam 115. Optical power shifter 135 is positioned to intercept excess light beam 125 and is configured to convert excess light beam 125 into a power-shifted light beam 140 comprising at least some wavelengths and/or power red-shifted relative to excess light beam 125. Combiner 150 is positioned to intercept both retained light beam 120 and power-shifted light beam 140, and is configured to combine retained light beam 120 and power-shifted light beam 140 onto a common path to produce output light beam 155 of a given output spectrum 155$p$, as described in detail hereafter.

Light source 105 can comprise a phosphor excited by a laser (not depicted). Separator 110 can comprise a dichroic mirror, a digital micromirror device, a bandpass filter, a Bragg stack, and/or a photonic crystal. Optional reflector 130 can comprise a mirror, and the like, configured to guide excess light beam 125 from separator 110 to optical power shifter 135. Optical power shifter 135 can comprise quantum dots, which can be suspended in solution and/or supported on a support substrate, and the like. Optional light guide 145 can comprise a mirror or a dichroic mirror, and can be configured to guide power-shifted light beam 140 from optical power shifter 135 to combiner 150. Combiner 150, in turn, can comprise a dichroic mirror, and the like.

Retained light beam 120 generally comprises wavelengths of light that are to be used in projection to achieve a colour balance, while excess light beam 125 comprises wavelengths of light that would lead to a colour imbalance. Accordingly, excess light beam 125 is conveyed to optical power shifter 135, for example, as depicted, using reflector 130, and/or any other suitable combination of optical elements, where excess light beam 125 is converted to power-shifted light beam 140 comprising wavelengths of light that can be used in projection to achieve a colour balance when combined with retained light beam 120. As such, retained light beam 120 and power-shifted light beam 140 are then combined using combiner 150 to produce output light beam 155, which can then be conveyed to a projection system. Operation of system 100 is described in detail hereafter.

In some implementations, light source 105 can comprise a combination of laser and a photoluminescent material, the laser emitting a laser light to excite the photoluminescent material, such as a phosphor, to emit input light beam 115. In an example implementation where the laser light is blue and the photoluminescent material is a yellow phosphor, input light beam 115 can have a spectrum 115$p$ as shown in FIG. 1.

Spectrum 115$p$ provides a plot of intensity (I) versus wavelength ($\lambda$), with peaks representing each of the colors yellow (Y), green (G), and red (R); in other words wavelengths and/or colours described herein are generally components of the human visual system (HVS). However, spectrum 115$p$ can include wavelengths outside of the HVS, for example in the infrared and/or ultraviolet wavelength ranges. While spectrum 115$p$ shows separate peaks for each colour, it is contemplated that spectrum 115$p$ can comprise one large emission peak or any number of emission peaks spanning a range of wavelengths encompassing some or all of green, yellow, and red colors. It should be noted that spectrum 115$p$, and the other spectra shown in the drawings and described herein, are schematic representations intended to demonstrate the principle of operation of system 100, and do not necessarily reflect an actual spectrum of any of their corresponding light beams. All the spectra shown in the drawings and described herein are provided by way of example only, and are not intended to be limiting. For example, the spectra depicted herein are not to scale. Furthermore, some spectra are depicted in terms of intensity and/or power intensity, such as spectrum 115$p$, while other spectra are depicted in terms of percentage (and/or fraction) reflection (and/or reflectivity) or percentage (and/or fraction) transmission (and/or transmissivity) and/or percentage (and/or fraction) absorption. Those spectra that are depicted in terms of intensity (e.g. indicated by using "I" on the y-axis) are appreciated to be spectra that are emitted and/or transmitted and/or conveyed in the form of light between optical components of system 100. Those spectra that are depicted in terms of reflection or transmission (e.g. indicated by using "Rf" or "T" on the y-axis) are appreciated to be spectra that are define how the associated component interacts with light impinging thereon, for example portions of such light that are reflected and/or transmitted by the associated optical component. Those spectra that are depicted in terms of absorption (e.g. indicated by using "A" on the y-axis) are appreciated to be spectra that define how the associated component interacts with light impinging thereon, for example portions of such light that are absorbed by the associated optical component.

In any event, as depicted in spectrum 115$p$, input light beam 115 can comprise relatively higher intensities of yellow and green, and a relatively lower intensity of red.

This wavelength distribution can be a result of the emission spectrum of the yellow phosphor, emitting strongly in yellow and green, and weakly in red. In a projector that uses red, green, and blue to generate its colour gamut, the low red intensity of input light beam can pose a problem. In addition, the relatively high intensity yellow light would not be useable by this projector to form the image, and would be discarded as a form of light waste and hence contribute to unwanted heating. Furthermore, power would be used to generate the discarded light, which can require power to remove; both processes contribute to degradation in overall system electrical efficiency. The blue light used to obtain a desired colour gamut can be obtained from a light source other than the phosphor, for example a blue laser, as will be described in greater detail below.

Figure 2:
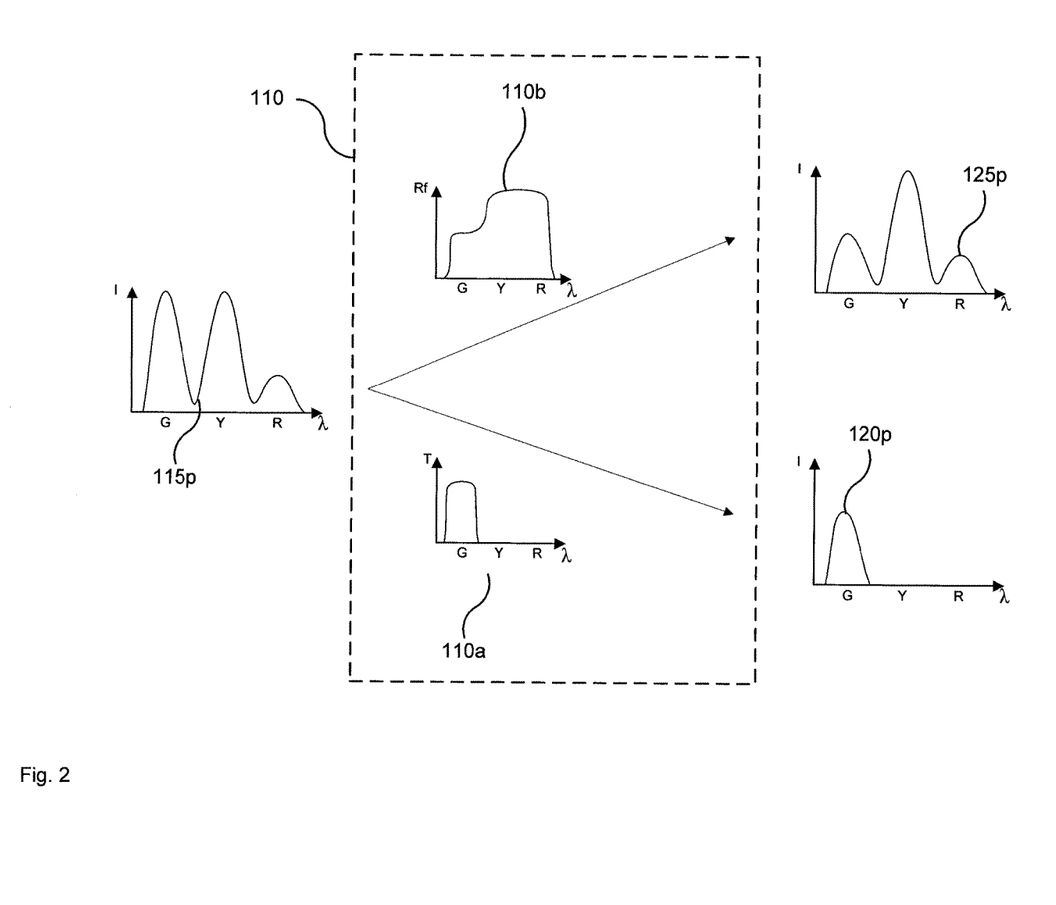
FIG. 2 depicts a schematic representation of spectra associated with a separator of the system of FIG. 1, according to non-limiting implementations.

Separator 110 can be positioned to intercept input light beam 115. In some implementations, separator 110 can comprise a dichroic mirror having a transmission spectrum 110a and a reflection spectrum 110b as shown in FIG. 2. Transmission spectrum 110a shows transmission (T) as a function of wavelength, and indicates that separator 110 has partial transmission in green, but no transmission in yellow or red. As a result, separator 110 transmits only a portion of the green light contained in input light beam 115. The light transmitted by separator 110 forms retained light beam 120 having a respective spectrum 120p, showing only a peak in the green.

Reflection spectrum 110b shows reflectivity (Rf) as a function of wavelength, and indicates that separator 110 reflects nearly all of the yellow and red light while only partially reflecting the green light. As a result, separator 110 reflects nearly all of the yellow and red light in input light beam 115, while reflecting only a portion of green to form excess light beam 125 having a spectrum 125p. Spectrum 125p shows that while excess light beam 125 has retained nearly all of the yellow and red light in input light beam 115, excess light beam 125 contains only a portion of the green light in input light beam 115 due to the partial reflectivity of separator 110 for green light.

In other implementations, retained light beam 120 can be obtained by the light reflected from separator 110, and excess light beam 125 can be obtained by the light transmitted by separator 110, with other components of system 100 repositioned accordingly. In some implementations, separator 110 can comprise a different wavelength and/or power specific light filter including, but not limited to, a prism, a Bragg stack, a photonic crystal, a bandpass filter, and a digital micromirror device (DMD).

In some implementations, separator 110 can comprise a dynamically tuneable filter, including but not limited to a prism with tuneable optical components, mechanically swapped filter, (e.g. using a turret and the like), a tuneable Bragg stack, a tuneable photonic crystal, a tuneable bandpass filter, and a DMD. Such a dynamically tuneable separator can be configured to separate input light beam 115 based on a given separation spectrum that can be dynamically changed or selected.

In some implementations, separator 110 can be further configured to separate input light beam 115 further based on intensity of input light beam 115. For example, a dichroic separator can have partial reflectivity for a given colour (e.g. as with green in profiles 110a, 110b) or a DMD separator can reflect only a portion of a given colour incident upon it. In some implementations, separator 110 can be dynamically tuneable to separate input light beam 115 based on a given separation intensity threshold profile. For example, a DMD separator 110 can be dynamically controlled to reflect varying fractions of intensity of a given colour incident upon it.

Optical power shifter 135 is configured to convert excess light beam 125 into a wavelength-shifted and/or optical power shifted light beam 140 comprising at least some wavelengths and/or power that is red-shifted relative to excess light beam 125. Red-shifting can comprise shifting towards a red end of the HVS, i.e. shifting towards the end of HVS with longer wavelengths and/or towards longer wavelengths (which could include, but is not limited to, light in the infrared range.

Figure 3:
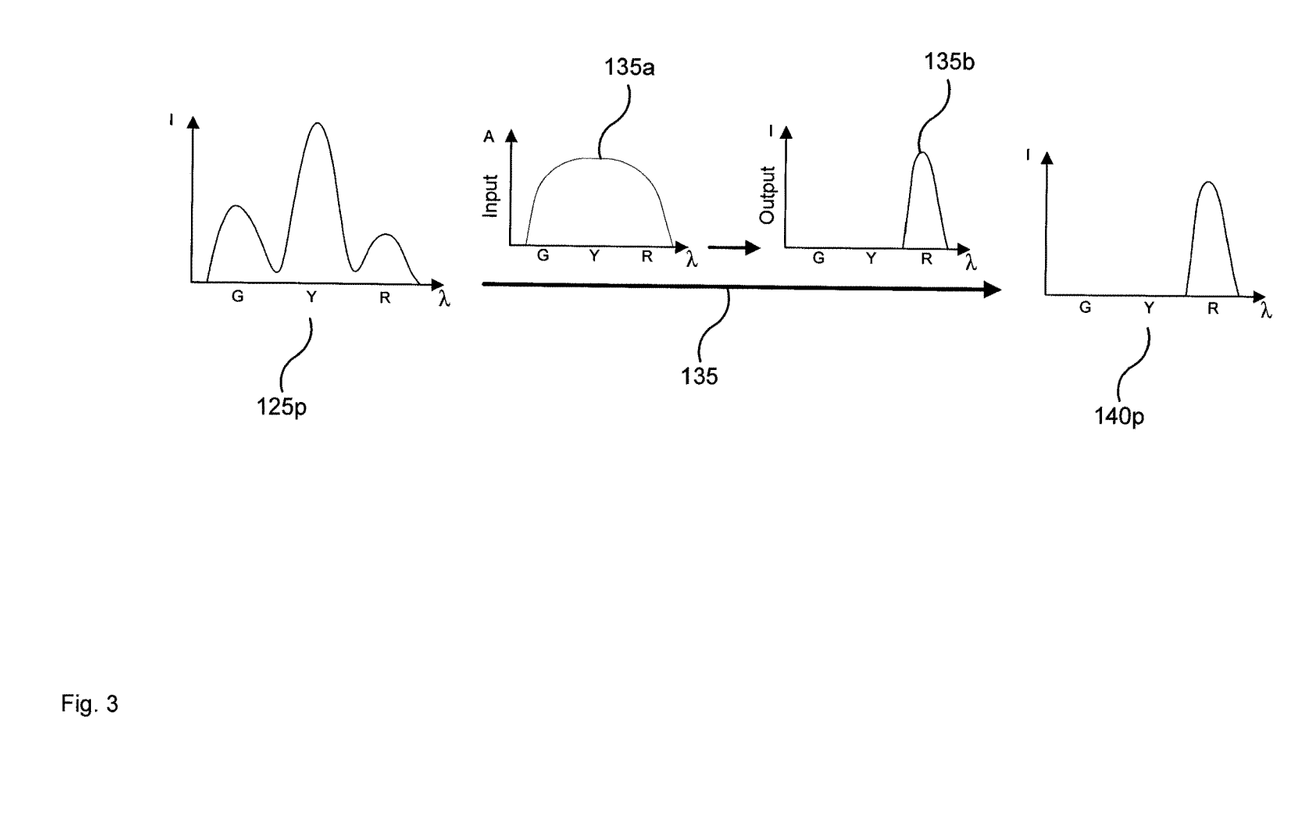
FIG. 3 depicts a schematic representation of spectra associated with an optical power shifter of the system of FIG. 1, according to non-limiting implementations.

FIG. 3 shows a schematic representation of the wavelength shifting and/or power shifting process, where optical power shifter 135 has an input wavelength shifting and/or input power shifting profile 135a (e.g. wavelengths and/or power absorbed) and an output wavelength shifting and/or output power shifting profile 135b (e.g. intensity of wavelengths and/or power emitted). Input power shifting profile 135a can represent the wavelengths and/or power that can be used, accepted, and/or absorbed by optical power shifter 135 for being shifted. Output power shifting profile 135b can represent the wavelength and/or power shifted output of optical power shifter 135; specifically, output power shifting profile 135b shows intensity as a function of wavelength. It is understood that output power shifting profile 135b can include wavelengths and/or power that is not generally affected by optical power shifter 135, for example wavelengths and/or power that is transmitted there through. In FIG. 3, the exemplary input power shifting profile 135a and output power shifting profile 135b, together, show that optical power shifter 135 can accept input light in wavelengths and/or powers corresponding to green, yellow and red and convert accepted green, yellow and red light and/or wavelengths and/or powers to produce red-shifted light and/or red-shifted wavelengths and/or red shifted power.

As shown in spectrum 125p, excess light beam 125 has a relatively higher intensity in yellow, a relatively moderate intensity in green, and a relatively lower intensity in red. The yellow and green in excess light beam 125 can be accepted as input light by optical power shifter 135, which red-shifts these wavelengths and/or power and produces output light in red, as shown in a spectrum 140p of power-shifted light beam 140. In some implementations, any red light in spectrum 125p can be absorbed and re-emitted as red light and/or transmitted through optical power shifter 135, which supplements the red light output by optical power shifter 135. Alternatively, separator 110 can be configured to not convey red light to optical power shifter 135, but only that light that is not useable in a the given application.

Returning to FIG. 1, light guide 145 can be a full reflector or a partial reflector with full reflectivity for power-shifted light beam 140. Combiner 150 is positioned to intercept both retained light beam 120 and power-shifted light beam 140, and is configured to combine retained light beam 120 and power-shifted light beam 140 onto a common path to produce output light beam 155. As depicted, in some implementations, combiner 150 can comprise a dichroic mirror configured to transmit power-shifted light beam 140 and further configured to reflect retained light beam 120 onto a same path as power-shifted light beam 140.

Figure 4:
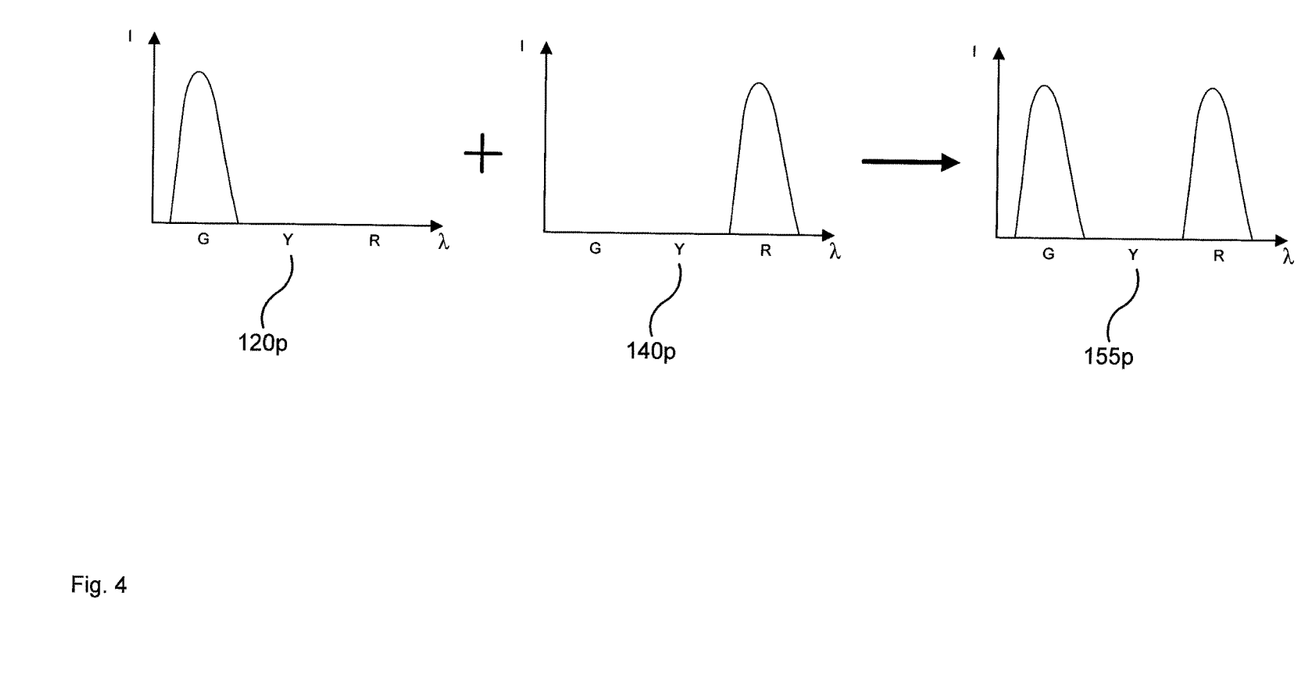
FIG. 4 depicts a schematic representation of spectra associated with a combiner of the system of FIG. 1, according to non-limiting implementations.

FIG. 4 shows schematically the combination, by combiner 150, of spectrum 120p of retained light beam 120 with spectrum 140p of power-shifted light beam 140 to produce output spectrum 155p of output light beam 155. As retained light beam 120 comprises green light and power-shifted light beam 140 comprises red light, the combination results in output light beam 155 comprising green and red light. It can be seen that through the use of system 100, input light beam 115 (see FIG. 1) having an excess of yellow (and/or green, and/or other colours of light) and a deficiency of red, e.g. in the context of use by an RGB projector, is converted to output light beam 155 having relative intensities of green and red useful for an RGB projector, and no and/or minimized yellow light (see FIG. 4). In addition, system 100 achieves this conversion without discarding, and thereby wasting, the yellow light of input light beam 115, and without the need for an additional, externally-powered red light source to supplement the red light deficiency of input light beam 115.

In some implementations, blue light can be added to output light beam 155. FIG. 1 shows a supplemental light beam 160 incident upon light guide 145. In this implementation, light guide 145 can be a partial reflector which can transmit supplemental light beam 160, while reflecting power-shifted light beam 140. Combiner 150 likewise can transmit supplemental light beam 160 and combine it with output light beam 155 along the common path with output light beam 155.

Figure 5:
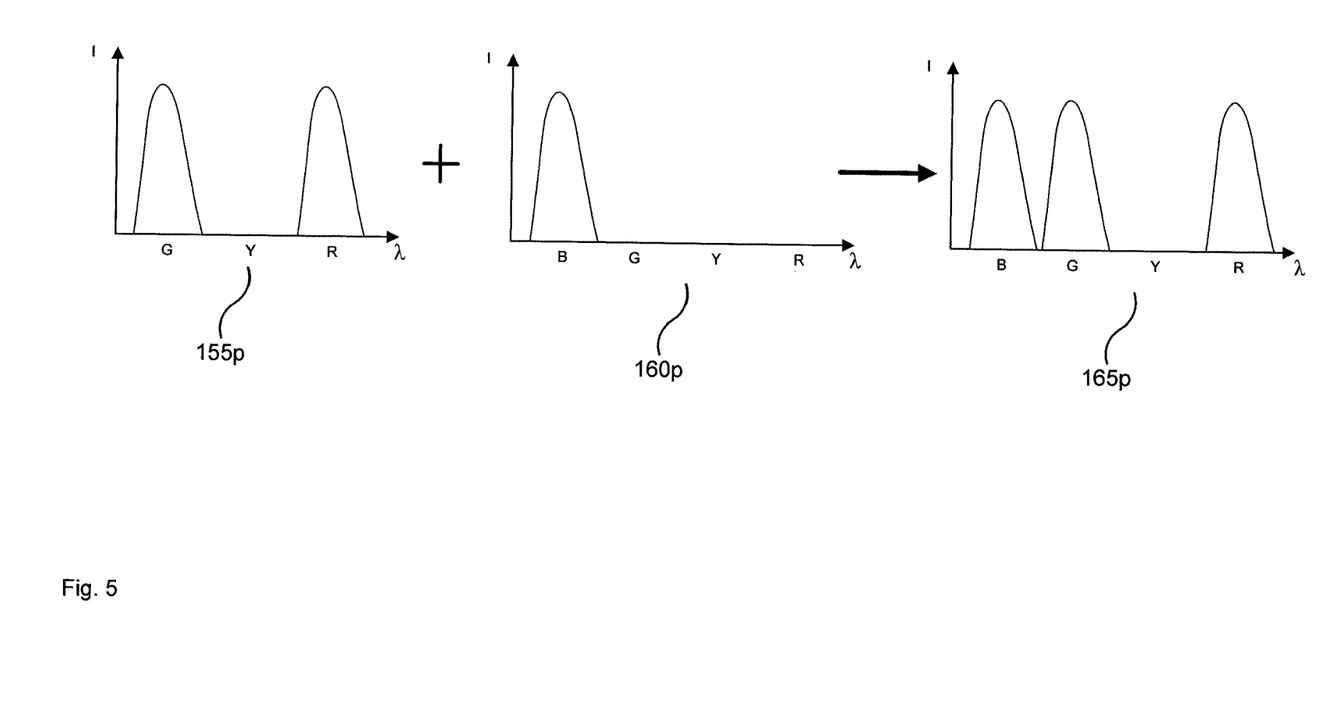
FIG. 5 depicts a schematic representation of spectra associated with an external light supplementation in the system of FIG. 1, according to non-limiting implementations.

Supplemental light beam 160 can be generated by the same laser used to excite the photoluminescent material of light source 105 to produce input light beam 115, and system 100 can include mirrors and/or other optical components to direct a portion of input light beam 115 to combiner 145. Alternatively, supplemental light beam 160 can be from a further light source different from light source 105. Indeed, supplemental light beam 160 can comprise one or more of at least a portion of light from light source 105 and light from a further light source (not depicted). When the laser comprises a blue laser used to excite a yellow phosphor, light from the blue laser can be added to output light beam 155 to create a supplemented output light beam having all three of blue, green, and red colors. FIG. 5 hence further depicts output spectrum 155p having green and red light, and supplemental light beam spectrum 160p having blue light. The addition of blue light produces supplemented output light beam 155 with a spectrum 165p, having all three of blue, green, and red colors and/or wavelengths, for example to be used by an RGB projector.

In some implementations, input power shifting profile 135a of optical power shifter 135 can be selected to at least partially overlap spectrum 125p of excess light beam 125 produced by separator 110. Partial overlap can comprise at least some of the wavelengths of light present in excess light beam 125 being able to be used by optical power shifter 135 to produce a red-shifted output. The more of the wavelengths of excess light beam 125 that can be used by optical power shifter 135, the more efficient system 100 will be in converting excess light beam 125 into a power-shifted light beam 140 that can be used to produce output light beam 155 of a given output spectrum. Input power shifting profile 135a can be selected by choosing the material of or tailoring the optical properties of optical power shifter 135, as will be further described below.

In some implementations, output power shifting profile 135b of optical power shifter 135 can be selected such that output power shifting profile 135b combined with the spectrum 120p of retained light beam 120 about matches the output spectrum 155p. For example, output power shifting profile 135b combined with the spectrum 120p about matching the output spectrum 155p can comprise having similar colors at relative intensities that are within tolerances known in the art to be acceptable for using the combination of power-shifted light beam 140 and retained light beam 120 for a selected application of output light beam 155, e.g. image projection.

For example, when the output spectrum 155p is to have green and red light at about equal intensities, and retained light beam 120 has green light and at least some red light, then output power shifting profile 135b can be selected such that output light beam 155 comprises green light and red light in a balance useful for producing an image in an RGB projector. In other words, the red light produced by optical power shifter 135 complements the green light, and any red light, of retained light beam 120 and produce a combined light beam having green and red lights of a desired balance and/or about equal intensities. Output power shifting profile 135b can be selected by choosing the material of or tailoring the optical properties of optical power shifter 135, as will be further described below.

In some implementations, optical power shifter 135 can comprise a plurality of quantum dots configured to absorb at least some wavelengths of excess light beam 125 and to emit light red-shifted relative to those wavelengths. Quantum dots can comprise semiconductor particles whose optical properties such as optical absorption and emission can depend on the size distribution and/or composition of the particles. Quantum dots can comprise semiconductor nanoparticles. Optical power shifter 135 can comprise a layer of quantum dots on a support substrate. The quantum dots can absorb at least some wavelengths of excess light beam 125 and emit light that is red-shifted relative to the wavelengths and/or power they absorbed.

When quantum dots are used to implement optical power shifter 135, input power shifting profile 135a can correspond to the absorption spectrum of the quantum dots, and output power shifting profile 135b can correspond to the emission spectrum of the quantum dots. The size distribution and/or composition of the quantum dots can be configured and/or selected so that the absorption spectrum of the quantum dots at least partially overlaps spectrum 125p of excess light beam 125. Partial overlap can comprise at least some of the wavelengths present in spectrum 125p being included in the absorption profile of the quantum dots.

Referring to FIG. 3, for example, there is partial overlap between spectrum 125p and input power shifting profile 135a (which in the case of quantum dots corresponds to the absorption profile) because both profiles have yellow and green lights. The greater the overlap, the more of excess light beam 125 can be absorbed and shifted by optical power shifter 135, and the more efficiently system 100 can convert excess light beam 125 into power-shifted light beam 140 useful for complementing retained light beam 120 to produce output light beam 155.

Indeed, in some implementations, spectrum 125p and input power shifting profile 135a can match. For example, an ideal "matching" of spectrum 125p and input power shifting profile 135a result in 100% absorption of all wavelengths present in the spectrum 125p. Put another way, each of spectrum 125p and input power shifting profile 135a can be selected such that all of light received at optical power shifter 135 is absorbed by optical power shifter 135, and converted to red light and/or to a given spectrum. Hence, by selecting the composition of the quantum dots and/or tailoring their size distribution, the absorption spectrum of the quantum dots can be tailored to be similar to the spectrum 125p of excess light beam 125. The term "similar" can be interpreted as spectrum 125p and the absorption profile of the quantum dots overlapping. This overlap can comprise at least about 60% of the energy in excess light beam 125 being able to be absorbed by the quantum dots to excite the quantum dots to emit red-shifted light. In other implementations, spectrum 125p can about match the absorption spectrum of the quantum dots. This matching can comprise at least about 85% of the energy in excess light beam 125 being able to be absorbed by the quantum dots to excite the quantum dots to emit red-shifted light.

In some implementations, optical power shifter 135, comprising quantum dots, interacts with all the wavelengths of excess light beam 125, and does not transmit intact any wavelengths of excess light beam 125. In such implementations, emission spectrum of the quantum dots corresponds to spectrum 140p of power-shifted light beam 140. Size distribution and/or composition of the quantum dots can be configured so that the emission spectrum of the quantum dots combined with spectrum 120p of retained light beam 120 yields output spectrum 155p. The combination of the emission spectrum of the quantum dots and spectrum 120p can about match the desired spectrum of output light beam 155. such "about matching" can comprise having similar colors at relative intensities that are within tolerances known in the art to be acceptable for using the combination of power-shifted light beam 140 (which in this case is the light emitted by the quantum dots) and retained light beam 120 for a given application of output light beam 155, for example image projection.

In addition to composition and size distribution of the quantum dots, their ligands, their support substrate and/or their suspension medium, and other aspects of their surroundings can also be controlled to tailor their absorption and emission properties. When optical power shifter 135 comprises quantum dots, the setup of system 100 directs only a portion of input light beam 115 onto the quantum dots which allows the quantum dots to contribute to the functioning of system 100 by red-shifting excess light beam 125, without exposing the quantum dots to the full power of input light beam 115 which could potentially exceed the operational power threshold of the quantum dots.

In some implementations, separator 110 can comprise a dichroic mirror. Excess light beam 125 can correspond to, and be formed by, a dichroic excess light separation profile, which can be one of transmission spectrum 110a and reflection spectrum 110b of separator 110. While in the exemplary implementation shown in FIG. 2 and described above excess light beam 125 corresponds to transmission spectrum 110a of separator 110, in other implementations excess light beam 125 can correspond to reflection spectrum 110b. When optical power shifter 135 comprises quantum dots, at least one of the size distribution and composition of the quantum dots can be configured so that the absorption spectrum of the quantum dots at least partially overlaps the dichroic excess light separation profile. Partially overlap can comprise there being common wavelengths between the dichroic excess light separation profile and the quantum dots' absorption spectrum. This overlap would allow at least some of excess light beam 125 separated by separator 110 to be absorbed by the quantum dots of optical power shifter 135.

Absorption spectrum of the quantum dots can also be similar to and/or about match the dichroic excess light separation profile. The term "similar" can mean that the dichroic excess light separation profile and the absorption profile of the quantum dots overlap. This overlap can comprise at least about 60% of the energy in excess light beam 125, separated accordingly to the dichroic excess light separation profile, being able to be absorbed by the quantum dots to excite the quantum dots to emit red-shifted light. The phrase "about match" can comprise about 60% to about 90% of the energy in excess light beam 125 being absorbed by the quantum dots to excite the quantum dots to emit red-shifted light, however other percentages of absorption are within the scope of present implementations.

The precise configuration of elements in system 100 is not intended to be limiting. Persons skilled in the art will appreciate that in order to produce output light beam 155 from input light beam 115, it is possible to use other configurations of light source 105, separator 110, optical power shifter 135, and combiner 150. In particular, different light beam paths and different numbers, types, and configurations of light directing elements, such as mirrors, can be used.

These different configurations can include an optical power shifter 135 that is reflective instead of, or in addition to, being transmissive. In other words, power-shifted light beam 140 can be reflected from optical power shifter 135.

The specific wavelengths and intensities of spectra depicted in the drawings and/or described herein, including but not limited to input, output, excess, retained, power-shifted, and supplemental light beams; emission and absorption profiles; transmission and reflection profiles; and input and output power shifting profiles are exemplary only, and are not intended to be limiting.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A system for producing an output light beam of a given output spectrum, the system comprising:
   a light source configured to generate an input light beam having an input spectrum including an intensity associated with wavelengths of light that would lead to colour imbalance in the given output spectrum;
   a separator configured to separate the input light beam, based on wavelength of the input light beam into:
   a retained light beam having a retained light beam spectrum including wavelengths of light that would lead to colour balance in the given output spectrum, the retained light beam directed along a first path; and
   an excess light beam having an excess light beam spectrum including the wavelengths of light that would lead to colour imbalance in the given output spectrum, the excess light beam directed along a second path, the excess light beam having:
   an intensity associated with green being lower than a corresponding intensity associated with green in the input light beam; and
   a respective intensity associated with yellow being about the same as a corresponding intensity associated with yellow in the input light beam;
   an optical power shifter positioned to intercept the excess light beam, the optical power shifter configured to convert the excess light beam into a power-shifted light beam having a power-shifted spectrum including wavelengths of light that would lead to colour balance in the given output spectrum, the power-shifted light beam comprising at least some power red-shifted relative to the excess light beam; and
   a combiner positioned to intercept both the retained light beam and the power-shifted light beam, the combiner configured to combine the retained light beam and the power-shifted light beam onto a common path to produce the output light beam.

2. The system of claim 1, wherein an input power shifting profile of the optical power shifter is selected to at least partially overlap the excess light beam spectrum produced by the separator.

3. The system of claim 1, wherein an output power shifting profile of the optical power shifter is selected such that, the output power shifting profile of the optical power shifter combined with the retained light beam spectrum about matches the given output spectrum of the output light beam.

4. The system of claim 1, wherein the optical power shifter comprises a plurality of quantum dots configured to absorb at least some wavelengths of the excess light beam and to emit light red-shifted relative thereto.

5. The system of claim 4, wherein at least one of a size distribution and a composition of the quantum dots is configured so that an absorption spectrum of the quantum dots at least partially overlaps the excess light beam spectrum.

6. The system of claim 4, wherein at least one of a size distribution and a composition of the quantum dots is configured so that an absorption spectrum of the quantum dots is one or more of: similar to the excess light beam spectrum; and, about matches the excess light beam spectrum.

7. The system of claim 4, wherein at least one of a size distribution and a composition of the quantum dots is configured so that an emission spectrum of the quantum dots combined with the retained light beam spectrum yields the given output spectrum.

8. The system of claim 4, wherein
the separator comprises a dichroic mirror;
the excess light beam corresponds to a dichroic excess light separation profile being one of a transmission spectrum and a reflection spectrum of the dichroic mirror; and
at least one of a size distribution and a composition of the quantum dots is configured so that an absorption spectrum of the quantum dots at least partially overlaps the dichroic excess light separation profile.

9. The system of claim 8, wherein the absorption spectrum of the quantum dots is one or more of: similar to the dichroic excess light separation profile; and, matching the dichroic excess light separation profile.

10. The system of claim 1, wherein the separator is dynamically wavelength tuneable to separate the input light beam based on a given separation spectrum.

11. The system of claim 1, wherein the separator is further configured to separate the input light beam based on intensity of the input light beam.

12. The system of claim 11, wherein the separator is dynamically tuneable to separate the input light beam based on a given separation intensity threshold profile.

13. The system of claim 1, wherein the separator comprises one or more of a prism, a dichroic mirror, a digital micromirror device, a bandpass filter, a Bragg stack, and a photonic crystal.

14. The system of claim 1, wherein the light source comprises a laser and a photoluminescent material, the laser emitting a laser light configured to excite the photoluminescent material to emit the input light beam.

15. The system of claim 1, wherein the combiner is configured to add one or more of at least a portion of light from the light source and light from a further light source to the retained light beam and the power-shifted light beam along the common path to produce the output light beam of the given output spectrum.

16. The system of claim 1, wherein the excess light beam further comprises a respective intensity associated with red being about the same as a corresponding intensity associated with red in the input light beam.

17. The system of claim 16, wherein the input light beam comprises red.

* * * * *